US007578395B2

(12) United States Patent
Gambini

(10) Patent No.: US 7,578,395 B2
(45) Date of Patent: Aug. 25, 2009

(54) APPARATUS FOR ELIMINATING THE TRIMMINGS OF ROLLS OR LOGS OF RIBBONLIKE MATERIAL

(76) Inventor: Giovanni Gambini, Via A. Omodeo 7, I - 56124 Pisa (IT)

( * ) Notice: Subject to any disclaimer, the term of this patent is extended or adjusted under 35 U.S.C. 154(b) by 846 days.

(21) Appl. No.: 11/157,372

(22) Filed: Jun. 21, 2005

(65) Prior Publication Data

US 2006/0086413 A1 Apr. 27, 2006

(30) Foreign Application Priority Data

Jun. 24, 2004 (IT) .......................... MI2004A1275

(51) Int. Cl.
*B07B 13/05* (2006.01)
*B65G 47/46* (2006.01)

(52) U.S. Cl. ....................... 209/660; 209/621; 209/659; 209/684; 198/460.1; 198/460.2

(58) Field of Classification Search ............. 198/459.1, 198/460.1, 460.2; 209/621, 651, 659, 660, 209/684

See application file for complete search history.

(56) References Cited

U.S. PATENT DOCUMENTS 4,462,287 A * 7/1984 Weis et al. .................... 83/104
6,332,527 B1 * 12/2001 Wierschke ............... 198/369.7
6,371,304 B2 * 4/2002 Gambini ..................... 209/620
6,607,082 B2 * 8/2003 Biagioni et al. ............. 209/620
6,820,750 B2 * 11/2004 Gambini ..................... 209/681
6,994,206 B2 * 2/2006 Adamski et al. ............ 198/733
7,080,738 B2 * 7/2006 Gambini ..................... 209/620

* cited by examiner

*Primary Examiner*—Douglas A Hess
(74) *Attorney, Agent, or Firm*—James V. Costigan; Hedman & Costigan, P.C.

(57) ABSTRACT

Apparatus for eliminating the trimmings of rolls or logs of ribbonlike material coming out of a cutting machine, where at least one roll or log is cut into rolls (14) and small rolls or trimmings (15) from the leading portion of the log and/or trimmings (15') from the trailing portion of the log, said rolls (14) and trimmings (15, 15') being made to advance one after another by means of at least one conveyor (11), which acts in a plane of feed (13), in which the plane of feed (13) comprises two sets of fixed supporting elements (16, 16') for supporting the rolls, said fixed supporting elements being set at a distance apart from one another so as to define an opening (19), in which there are arranged guides (18) for mobile supporting elements (17) for supporting the rolls, the mobile supporting elements (17) being controlled so as to displace to and fro between two sets of fixed supporting elements (16, 16') and with respect to the opening (19) on the guides, which are set at a distance apart from one another, the mobile supporting elements being displaced to and fro in response to a signal and/or according to a pre-set pitch, there further being provided arresting elements (21, 22) for arresting the rolls (14) with respect to at least one set of fixed supporting elements (16').

4 Claims, 4 Drawing Sheets

APPARATUS FOR ELIMINATING THE TRIMMINGS OF ROLLS OR LOGS OF RIBBONLIKE MATERIAL

The present invention relates to an apparatus for eliminating the trimmings of logs of ribbonlike material, in particular ones coming out of a cutting machine.

Currently, for the production of rolls or the like of paper wipes and/or toilet paper, first the so-called logs of paper are produced, which may or may not be wound on cores and which have a pre-set diameter and height. After this operation, the logs are cut to obtain rolls cut to the final size required, which are ready to be distributed for use.

The above operations of cutting to a given size are performed by means of purposely designed cutting machines. These cutting machines in general receive a series of logs arranged parallel to one another and cut them, using rotary blades, into a plurality of narrower rolls. Said rolls arrange themselves in succession one after another, according to the chosen size, ready for being sent on for packaging.

On the other hand, it should be noted that, during this operation of cutting of the logs, both at the leading end and at the trailing end of each individual log also end sections are formed. These end sections are not usable in so far as they are in the form of small rolls or trimmings that are too narrow.

Apart from the fact that said leading end and trailing end sections are not marketable, they would get mixed up with the finished rolls that are fed one after another to the subsequent packaging stage.

For this reason, in order to prevent any interference with the packaging operation, these trimmings or sections deriving from cutting of the logs, must be eliminated during removal of the rolls cut to size so that they do not hinder the packaging operation. In fact, the presence of end trimmings could block the packaging machine and cause production of packages containing a wrong number of rolls, on account of their presence in the final packs.

It is hence for the purpose of seeking to eliminate the above problems that particular devices for separation and elimination of trimmings have been developed and used.

In a first current embodiment, there is envisaged suction of all the rolls cut to size as these advance one after another, after cutting. This enables them to be withheld, whereas the trimmings from the leading and trailing portions of the logs advance until they fall into a discard opening, since they are not withheld by suction.

To obtain the foregoing, it is necessary to have a precise and complicated correlation of the various components of these devices. This entails a complex system and one that is by no means easy to devise and set up.

The presence of the suction acting on the outer part of the rolls as they advance may moreover lead to damage of their outer surfaces, with the possibility of the rolls not being in conformance with the precise requirements of the user.

In a second known embodiment, associated to the opening for elimination of the trimmings are two retractable surfaces or walls which open up and/or close the opening in hatchway fashion according to predefined and correlated sequences. This occurs for each cut product as this passes according to whether it is a roll cut to the right size or an end trimming. A first retractable surface closes the opening, once the trimming of the leading portion of the log has passed, and a second retractable surface intervenes when the trimming of the trailing portion of the log passes, i.e., when passage of rolls cut to the right size restarts.

This second embodiment, even though it guarantees proper operation, may create problems connected to movement in perfect synchronism between the two retractable surfaces that provide the hatchway opening and the conveyors for advance of the rolls and the trimmings in succession. There may in fact occur jamming, and correct setting-up of the various parts is by no means straightforward.

A purpose of the present invention is to provide an apparatus for eliminating the trimmings of logs of ribbonlike material, in particular ones coming out of a cutting machine, which will be able to solve all the technical problems outlined previously.

A further purpose of the present invention is to provide an apparatus that will enable elimination of the trimmings of both the leading and the trailing portions of the logs, without any jamming or error in their selection.

Yet a further purpose of the invention is to provide an apparatus that will be extremely simple in its constructional makeup and will be equally easy to use.

The above purposes according to the present invention are achieved by an apparatus for eliminating the trimmings of logs of ribbonlike material, in particular ones coming out of a cutting machine, as set forth in Claim 1.

Further characteristics of the invention are specified in the subsequent claims.

The characteristics and advantages of an apparatus for eliminating the trimmings of logs of ribbonlike material according to the present invention will emerge more clearly evident from the ensuing description, which is provided purely by way of non-limiting example, with reference to the annexed plate of drawings, and in which.

Figure 1:
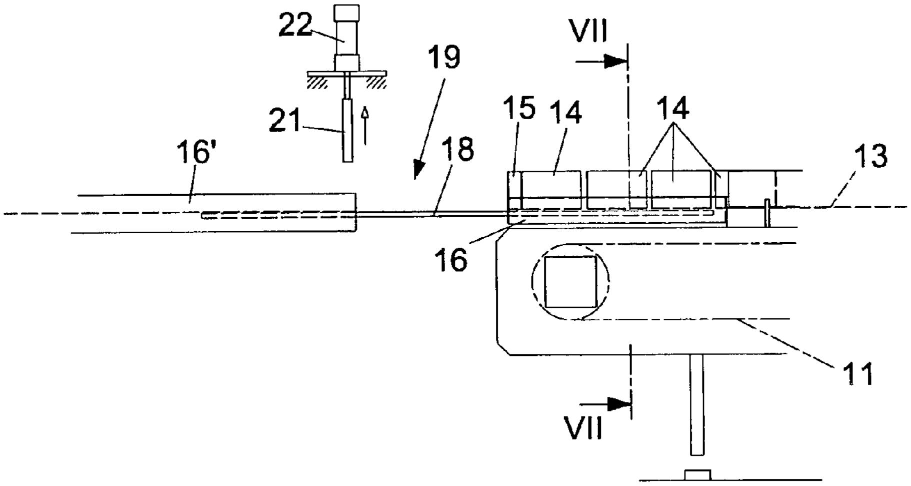
FIG. 1 is a side elevation view of an apparatus for eliminating the trimmings of logs of ribbonlike material according to the invention, in a first operating step.

With reference to the figures, illustrated therein is an apparatus for eliminating the trimmings of at least one log (i.e., a large lengthy roll) of ribbonlike material, in particular an apparatus of the type that can be set downstream of a cutting machine (not illustrated).

In general, at output from the cutting machine, the rolls 14, cut to size from a plurality of logs set alongside one another, are removed and are then sent on for packaging. For the reasons described previously, in the operation of cutting of the rolls 14, trimmings or sections 15 of the leading portion and trimmings or sections 15' of the trailing portion of each of the logs are formed.

In the apparatus of the invention, set in a position corresponding to the area of output from the cutting machine is a conveyor 11, for example one with pushers 12 or of any other type, which causes advance of the finished rolls 14 on a feeding surface 13. More precisely, the cutting machine (not illustrated) identifies a plurality of rows of rolls 14, parallel to one another with respective small rolls or trimmings 15 of the leading portion of each log and small rolls or trimmings 15' of the trailing portion of each log, which initially slide on a first set of fixed supporting elements 16. These fixed supporting elements 16 are in actual fact hollow elements, for example shaped so as to have a triangular or trapezial cross section, set within which so that they are able to slide telescopically are mobile supporting elements 17. These mobile supporting elements 17 are able to slide on guides 18, fixed between the aforesaid first set of fixed supporting elements 16 and a second set of fixed supporting elements 16', which is set at a distance from the first set so as to define an opening 19 and is also identified by hollow elements. In greater detail, these mobile supporting elements 17 are caused to slide to and fro on the guides 18 thanks to actuator elements (not illustrated), such as cylinders or motors, controlled in phase, during advancement of the conveyor 11 equipped with pushers 12. It is moreover to be noted that the guides 18 can be made up of shaped sectional elements, open at the top, within which there are slidably guided bearings or wheels 20 fixed to the mobile supporting elements 17. Alternatively, the guides may have any other shape turned upside down or turned over to one side such as to prevent any entry of dust or other foreign bodies that might hinder operation. In addition, the guides 18 are set at a distance from one another so as to enable easy and reliable dropping of the small rolls or trimmings 15 of the leading portion of each log and of the small rolls or trimmings 15' of the trailing portion of each log, when they are left free by the supporting elements.

The mobile supporting elements 17 are displaced to and fro with respect to the hatchway opening 19 in response to a signal and or according to a predetermined pitch, which is such, in any case, as to free the opening 19 when there appear small rolls or trimmings 15 of the leading portion of each log and small rolls or trimmings 15' of the trailing portion of each log.

It should be noted that the pushers 12 of the conveyor 11 are placed on a series of chains, which are wound in a loop, are parallel to one another, and form said loop, and are made to advance between fixed supporting elements 16, which thus perform also the action of fixed elements for sliding of the rolls 14 and of the trimmings 15 of the leading portion and trimmings 15' of the trailing portion.

The apparatus of the invention also envisages rod-like arresting elements 21, which can be actuated to intervene by means of respective actuators 22, such as cylinders, for arresting any possible displacement of the rolls 14, which are arranged and supported by the second set of fixed supporting elements 16', upon movement of recall of the mobile supporting elements 17 towards the first set of fixed supporting elements 16.

Operation of an apparatus according to the present invention is extremely simple and easy to understand.

Once the logs (or log) have been produced, they are made to advance towards a cutting machine (not illustrated), where they are cut into a series of finished rolls 14, set one after another and ready for packaging.

This operation of cutting generates, in addition to the rolls 14, also small rolls or trimmings 15 of the leading portion of each log and small rolls or trimmings 15' of the trailing portion of each log. The presence of the conveyor 11 and of the respective pushers 12 brings about sliding both of the rolls 14 and of the trimmings 15 of the leading portion and trimmings 15' of the trailing portion on top of the first set of fixed supporting elements 16 until the trimmings 15 of the leading portion and the first rolls 14 of the various rows of rolls reach the final end of the first set of fixed supporting elements 16 (FIG. 1).

Figure 2:
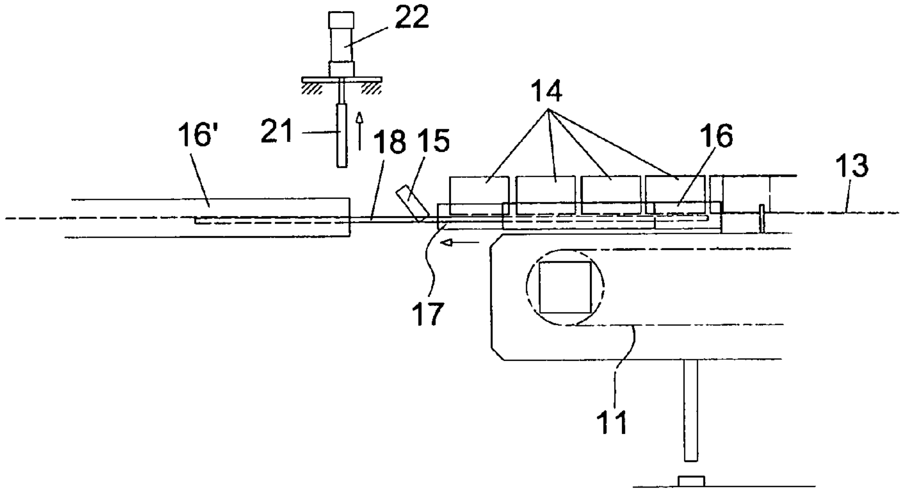
FIGS. 2 to 6 are side elevation views similar to that of FIG. 1 in a series of subsequent operating steps for elimination of the trimmings of the leading and trailing portions of the log and for passage of the rolls that have been properly cut.

A further advance of the pushers 12 brings about dropping of the leading trimmings 15 between the guides 18 in the hatchway opening 19 provided between the first set of fixed supporting elements 16 and the second set of fixed supporting elements 16' (FIG. 2).

Almost simultaneously, by means of the respective actuators (not illustrated), the mobile supporting elements 17 are activated so that they advance in the direction of the second set of fixed supporting elements 16' so as to close the opening 19.

Said displacement also brings about conveying of the rolls 14, which, upon arrest of these mobile supporting elements 17 astride of the hatchway opening 19, are forced to advance and are unloaded from the first set of fixed supporting elements 16, setting themselves one after another on the mobile supporting elements 17.

Figure 3:
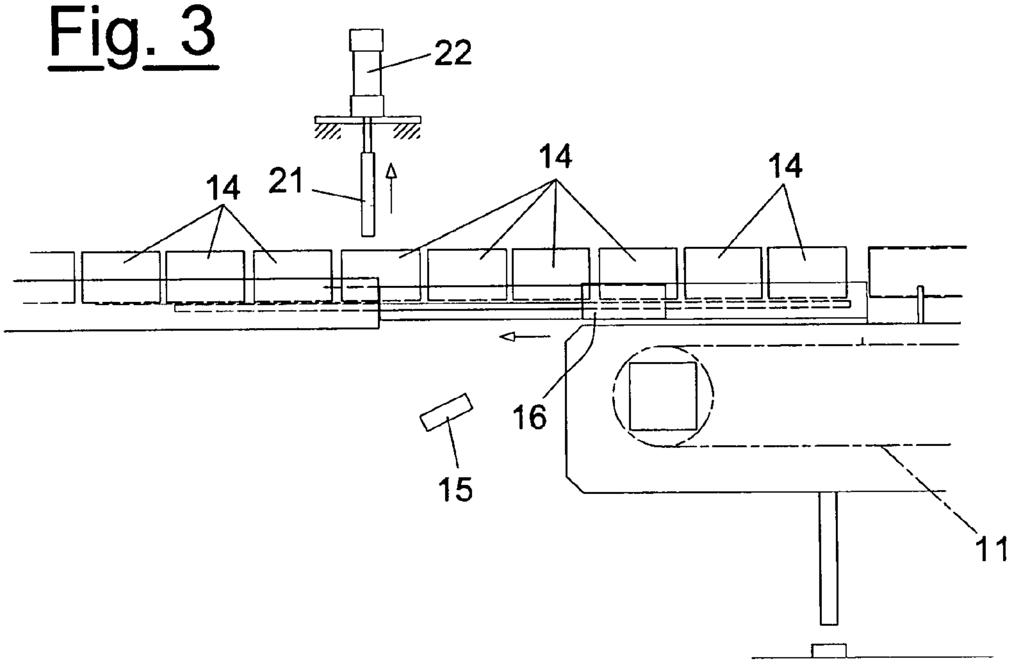

Given that advance of the rolls 14 occurs as a function of the length of the original logs prior to cutting, it can be envisaged that the mobile supporting elements 17 will be arrested for a certain time (FIG. 3). Then, they start to move forwards again following upon issuing of a signal and/or according to a predetermined pitch, so that they start to insert telescopically into the second set of fixed supporting elements 16' and complete advance and conveyance of the rolls 14 cut from the individual log.

Figure 4:
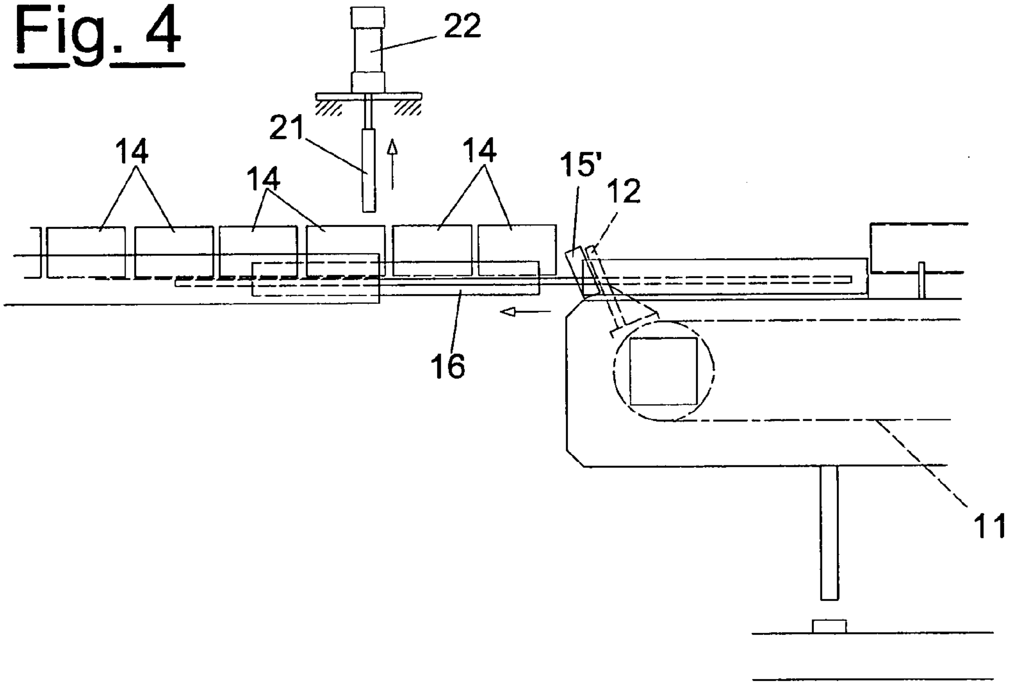

It is in this step that the hatchway opening 19 starts to become free again, and the trailing end trimmings 15', which are also pushed by the pushers 12, are caused to drop through the same opening 19 between the guides 18 so as to be eliminated (FIG. 4).

Feed of the rolls then continues until all the rolls 14 have been completely conveyed by the mobile supporting elements 17 onto the second set of fixed supporting elements 16'.

Figure 5:
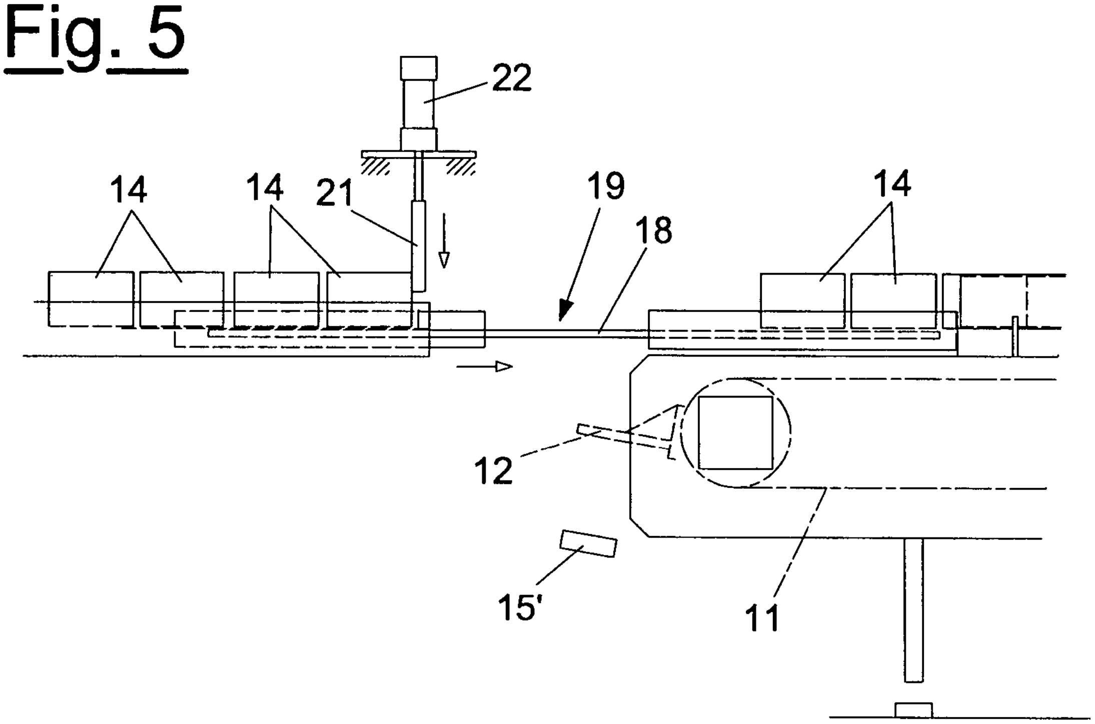

At this point, the arresting elements 21 are made to descend by the actuator cylinders 22, position themselves behind the last rolls 14 and block them in such a way that they cannot be made to move back in any way (FIG. 5).

The fact that the last rolls 14 are blocked in this way enables the mobile supporting elements 17, which had moved into the second set of fixed supporting elements 16', to be made to move backwards into their starting position. In this way, the mobile supporting elements 17 are made to slide out of the second set of fixed supporting elements 16' that had received them, without it being possible for the rolls 14 to be moved back again. Consequently, the mobile supporting elements 17 recede for an entire reverse stroke until they insert into the first set of fixed supporting elements 16.

Figure 6:
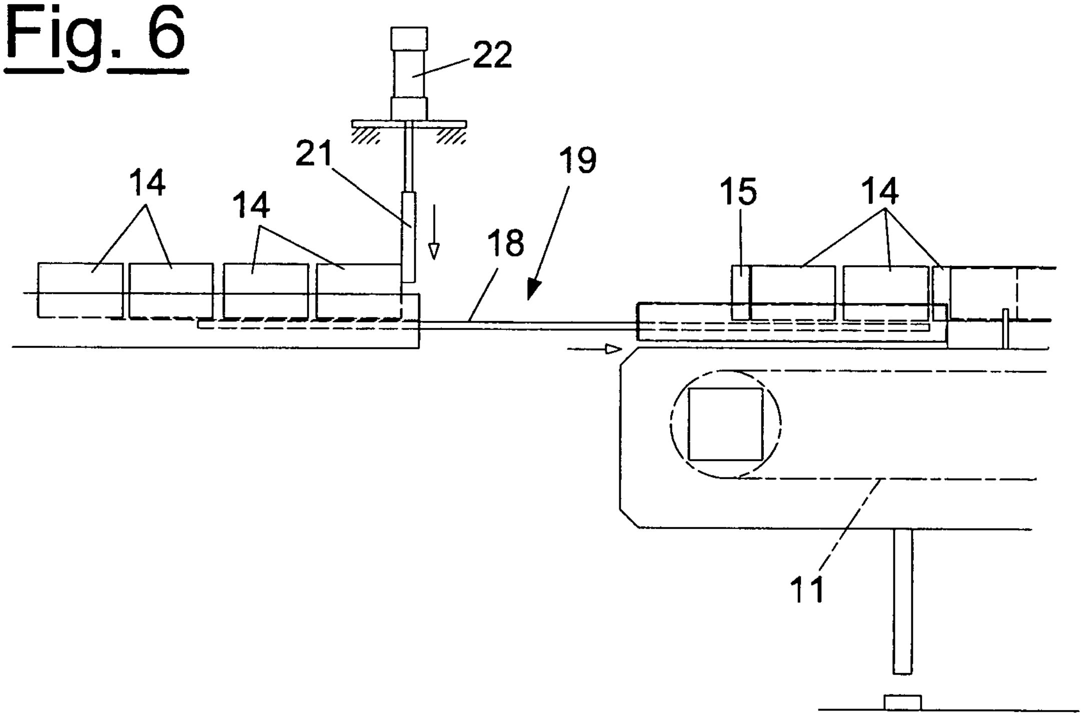
Figure 7:
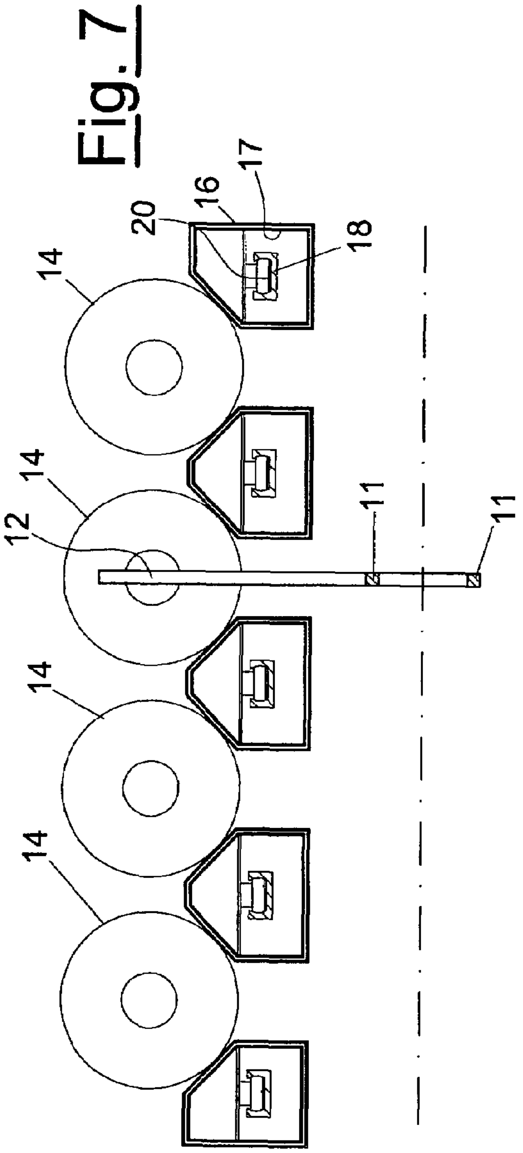
FIG. 7 is an enlarged cross-sectional view according to the line of trace VII-VII of FIG. 1.
Figure 8:
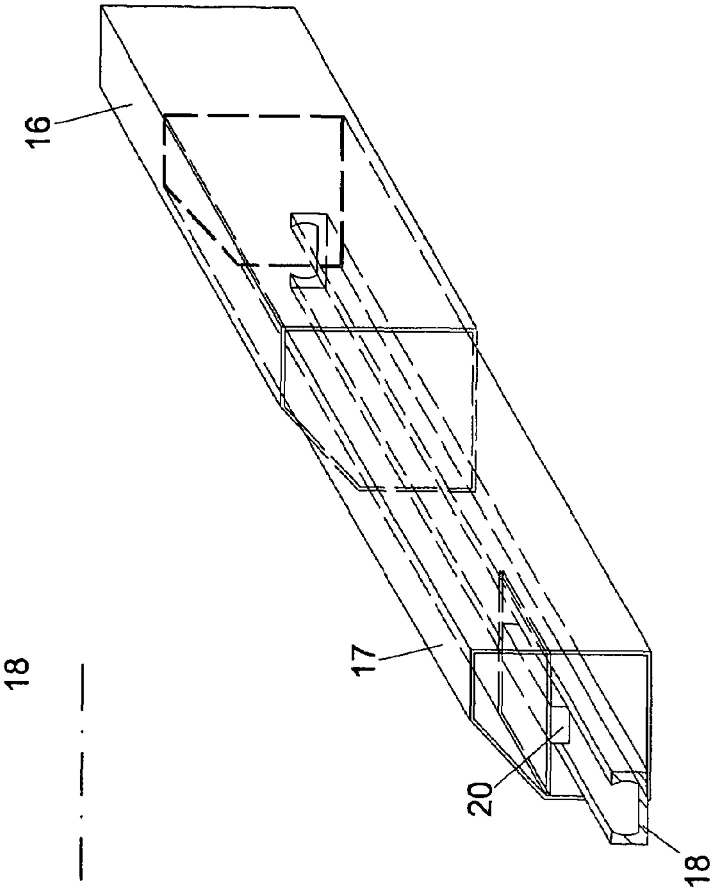
FIG. 8 is an enlarged perspective view of a pair of mobile and fixed supporting elements.

In the meantime, another set of logs set alongside one another has been cut and reduced to rolls 14, which are made to advance by the pushers 12 towards the end portion of the first set of fixed supporting elements 16 (FIG. 6) with the leading trimmings 15 in front of said rows of rolls 14.

Then, the cycle of feeding of the rolls 14 and of discarding of the leading trimmings 15 and trailing trimmings 15' is once more repeated.

In this way, a reliable and simple removal of the small rolls or trimmings 15 of the leading portion of each log and small rolls or trimmings 15' of the trailing portion of each log is obtained in such a way as to guarantee correct packaging.

As has been said previously, whatever the number of logs, it is sufficient to have an adequate number of fixed and mobile supporting elements which will guarantee handling for conveyance of the rolls 14 and for elimination of the trimmings 15, 15'.

It has thus been shown that an apparatus for eliminating the trimmings of logs of ribbonlike material coming out of a cutting machine for cutting at least one log into rolls according to the present invention achieves the purposes outlined above.

The apparatus according to the present invention thus conceived may undergo numerous modifications and variations, all of which fall within the scope of the same inventive concept.

Furthermore, in practice, the materials used, as well as the dimensions and components, may be any whatsoever according to the technical requirements.

The invention claimed is:

1. An apparatus for eliminating trimmings of rolls or logs of ribbonlike material coming out of a cutting machine, where at least one roll or log is cut into rolls (14) and small rolls or trimmings (15) from a leading portion of the log and/or small rolls or trimmings (15') from a trailing portion of the log, said rolls (14) and trimmings (15, 15') being made to advance one after another by at least one conveyor (11), which acts in a plane of feed (13), said apparatus being characterized in that the plane of feed (13) comprises two sets of fixed supporting elements (16, 16') for supporting the rolls, said fixed supporting elements being set at a distance apart from one another so as to define an opening (19), in which there are arranged guides (18) for mobile supporting elements (17) for supporting the rolls, the mobile supporting elements (17) being controlled so as to displace to and fro between the two sets of fixed supporting elements (16, 16') and with respect to the opening (19) on said guides which are set at a distance apart from one another, said mobile supporting elements being displaced to and fro in response to a signal and/or according to a pre-set pitch, further comprising arresting elements (21, 22) for arresting the rolls (14) with respect to said at least one set of fixed supporting elements (16') wherein said two sets of fixed supporting elements (16, 16') and said mobile supporting elements (17) are hollow and in that the latter can be telescopically displaced with respect to the former.

2. The apparatus according to claim 1 characterized in that said two sets of fixed supporting elements (16, 16') and said mobile supporting elements (17), which are hollowed, have a triangular or trapezial cross section.

3. The apparatus according to claim 1, characterized in that said guides (18) are constituted by shaped sectional elements, open at the top, within which there are slidably guided bearings or wheels (20), fixed to each of said mobile supporting elements (17).

4. The apparatus according to claim 1, characterized in that said elements for arresting said rolls (14) comprise rod-like arresting elements (21), which can be actuated for intervening by respective actuators (22).

* * * * *